Nov. 14, 1967

R. L. SHOEMAKER 3,352,468

SLIDE FILM ADVANCE MECHANISMS

Filed May 24, 1965

INVENTOR:
Robert L. Shoemaker
By Stevens, Lehrer r Stevens
Att'ys.

Nov. 14, 1967  R. L. SHOEMAKER  3,352,468
SLIDE FILM ADVANCE MECHANISMS
Filed May 24, 1965  2 Sheets-Sheet 2
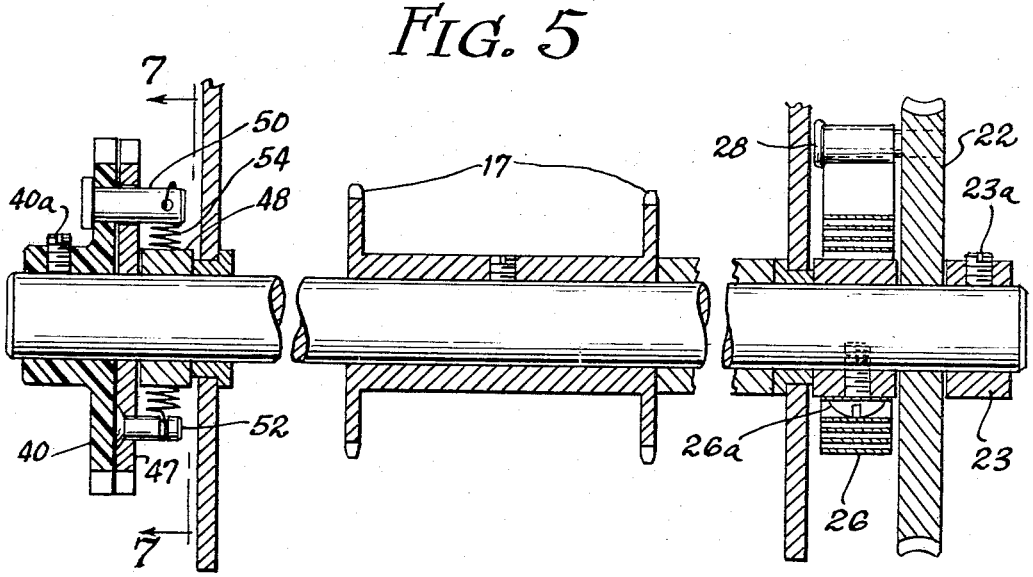
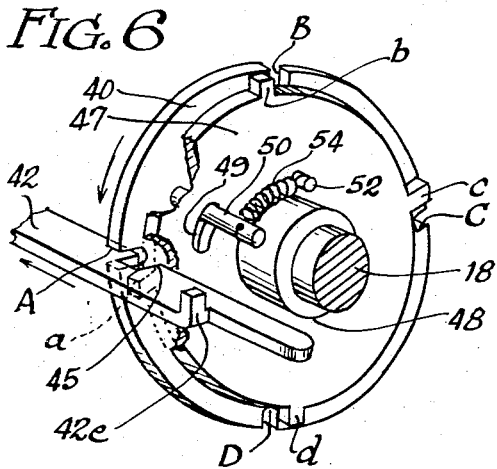
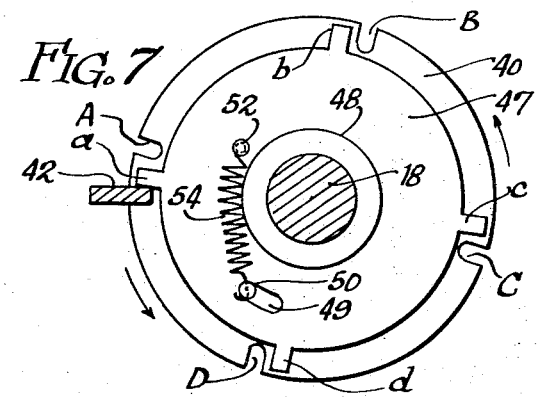
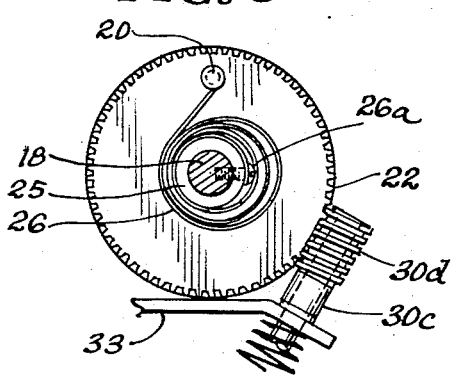
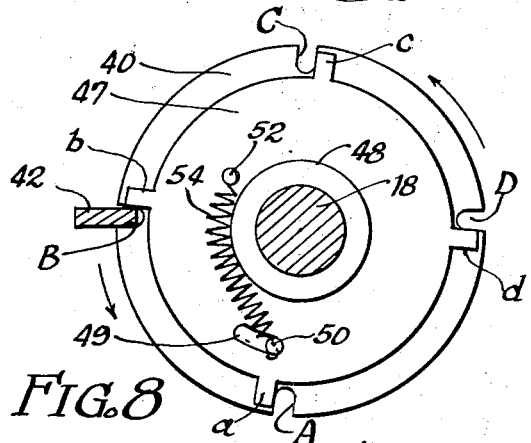
INVENTOR:
Robert L. Shoemaker
By Stevens, Lehrer + Stevens
Attys.

United States Patent Office 3,352,468
Patented Nov. 14, 1967

3,352,468
SLIDE FILM ADVANCE MECHANISMS
Robert L. Shoemaker, 1017 Elm St.,
Winnetka, Ill. 60093
Filed May 24, 1965, Ser. No. 457,990
9 Claims. (Cl. 226—47)

My invention relates to pictures or informative material carried on a film strip in simulation of slides and advanced periodically through a projector to remain stationary for a viewing period of varying duration. While this period may range from a few seconds to a number of minutes—according to the subject of the film and the time allotted for viewing each slide—it is important that the change from one slide to the next be accomplished instantly in order to avoid the optical effect of intermittent motion. Various attempts have been made to build up power for a quick advance of the film in the manner stated, such power being procured directly when the advance of the film is actuated. Among the modern methods for accomplishing this action is a ratchet mechanism activated by a solenoid to move the film the distance of one slide. However for the more popular size of film the length of the movement requires a solenoid with a high-mass armature and a large amount of energy to move it, such an armature having a greater inertia than the film itself. Also, such a solenoid is required to bottom in order to be efficient, creating a loud noise clearly objectionable in a film-viewing environment. Other methods, some employing an electric motor driving the film through a ratchet or through a Geneva motion and a flywheel, have been designed in a manner to impart a fast film advance whenever required, but they involve much stand-by weight or power, and mechanical complications. These factors are objectionable in principle—even where line current is readily available for furnishing the power required—but out of question when the projector is battery-powered for portable service or use in places where line current is not available or difficult to connect. Another method employed when the film advance is actuated is a motor or other electrical means to tension or wind a spring, the automatic release of the same inducing the film advance. This method requires a strong current which disqualifies the use of a small motor or battery for portability and economy.

It should be apparent that the time allowed for viewing a slide is usually much longer than that necessary to advance the film. Thus, a speed of 1/20 of a second or faster is desirable for the advance, whereas the viewing duration may be from 20 times to hundreds of times the advancing period. It is therefore the main object of the present invention to utilize such duration—the comparatively longer viewing time—for building up an adequate amount of stand-by power, and provide means for its instant application at full torque when required.

A further object is to provide a mechanism employing an electric motor with a reducing gear to build up spring power during still periods of the film, and automatic means to stop the motor when a sufficient amount of stand-by power has been built up in the spring.

Another object is to provide a simple escapement—actuated either manually or by means of a solenoid—to apply the rotary power of the spring for the instant advance of the film.

An additional object is to include a damping element in the escapement which softens the advancing impact on the film in order to save it from injury or wear.

A better understanding of the invention may be gained by reference to the accompanying drawings, in which—

FIG. 5 is an enlarged section on the line 5—5 of FIG. 3, broken away at intermediate points;

FIG. 6 is a perspective view, partly broken away, showing the escapement operative for the film advance as positioned prior to such advance;

FIGS. 7 and 8 are elevational views similar to FIG. 6 showing changes of position in the operation of the escapement; and FIG. 9 is an enlarged section on the line 9—9 of FIG. 1.

Figure 1:
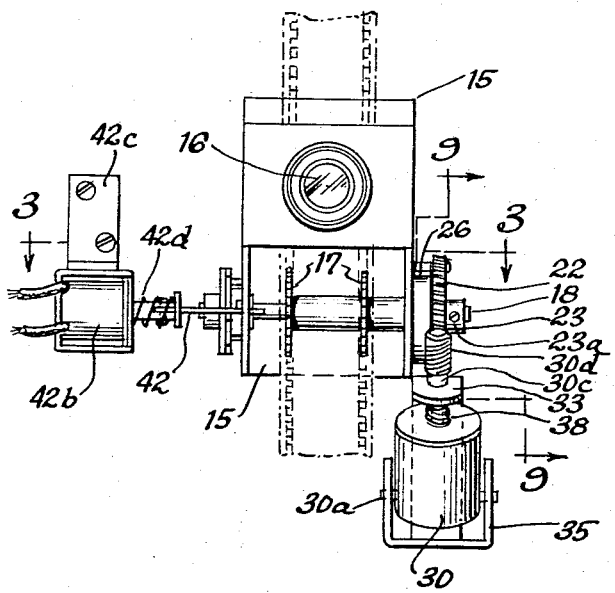
FIG. 1 is a front elevation of a typical slide-film projector—with the film-gate removed—showing the improved film-advancing mechanism applied to the projector.
Figure 2:
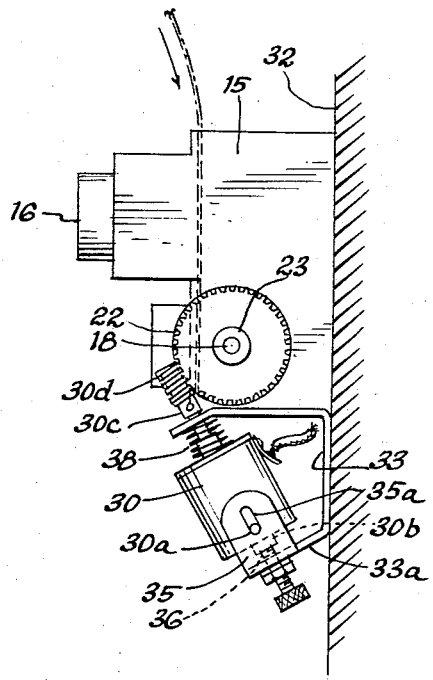
FIG. 2 is an elevation from the right-hand side of FIG. 1.

Referring specifically to the drawings, 15 denotes the frame of the projector, 16 its lens, 17 the film sprocket, 18 the shaft of the same, and 19 the film gate. The film advance is usually one slide—or frame—at each quarter-turn of the sprocket. In the novel embodiment, the drive to the shaft 18 first involves a worm gear 22 journaled on the shaft near its outer end, as noted near the right-hand end of FIGS. 3 and 5. A collar 23 forms an end-guard for the gear, and is secured on the shaft by a set-screw 23a.

On the inner side of the gear 22 the shaft 18 carries a collar 25; and the inner end of a helical spring 26 is secured to the collar and the shaft by a screw 26a. The outer end of the spring is carried by a pin 28 driven into the gear 22. The latter may thus be rotated to wind the spring 26 and exert driving influence on the shaft.

The drive to the worm gear 22 originates with an electric motor 30 so small in size that it may be driven by a battery or re-chargeable battery-pack. A support 32 for the projector also receives a bracket 33 at one side for the support of the motor. A bottom extension 33a of the bracket carries a receptacle 35 for the sliding support of the motor, the latter having side pins 30a passing through slots 35a in the sides of the receptacle. The bracket 33 also carries a screw-type contact 36 for a bottom terminal 30b of the motor, the weight of the latter normally closing the contact in the manner of a switch to keep the motor in operation. A compression spring 38 is interposed between the top of the motor and a top extension 33b of the bracket 33 in order to insure the engagement of the terminal 30b with the contact screw 36. The upper end of the motor shaft 30c carries a worm pinion 30d in mesh with the worm gear 22.

When the motor 30 is in operation, and the shaft 18 is held against rotation, the winding of the spring 26 will reach a maximum resistance where the pinion 30d will assume a tendency to advance during rotation, this action drawing on the motor with the effect of separating the motor terminal 30b from the contact 36 and stopping the motor. Since the worm gear 22 cannot turn through its relation with the worm, the spring will remain wound as long as the shaft 18 is held against rotation.

A factor in the escapement holds the shaft 18 as stated, and is in the form of an index disc 40 mounted on the end of the shaft opposite from the gear 22, as shown in FIG. 5, a set-screw 40a serving to secure the disc to the shaft. The disc has a series of peripheral notches A, B, C and D at 90-degree intervals in conformity with the quarter-turn advance of the film as mentioned above; and a slide bar 42 seats in one of the aforesaid notches—such as A at the left in FIG. 6— to lock the index disc and hold the shaft 18 against rotation and the spring 38 wound during the intervals between film advances.

Figure 3:
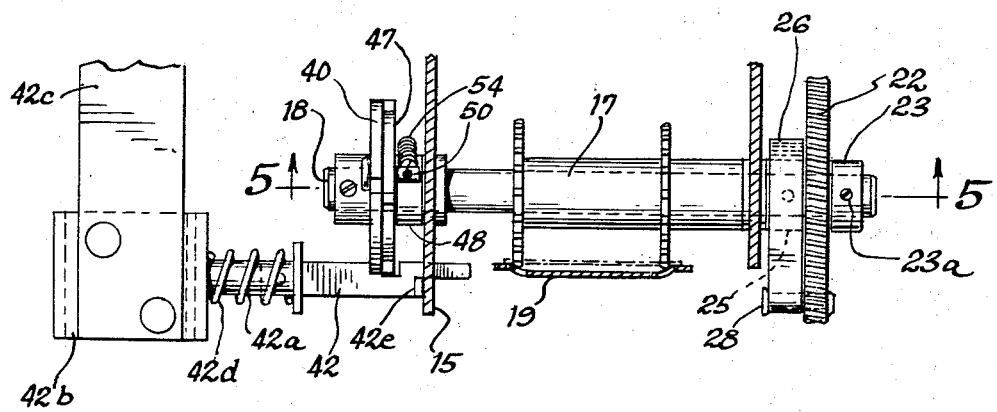
FIG. 3 is an enlarged section of the main portion of the advancing mechanism, taken on the line 3—3 of FIG. 1.
Figure 4:
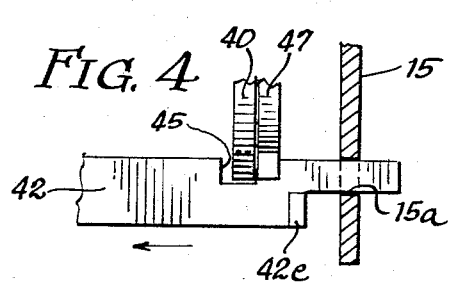
FIG. 4 is a further enlargement of a slide bar seen in the bottom center portion of FIG. 3, showing a change of position.

Film advances in the present mechanism may be induced by the direct control of the slide bar 42. However, it is customary to control such advances by push button, and means so actuated are illustrated. Thus, according to FIGS. 3 and 4 the slide bar forms part of the armature 42a of a solenoid 42b suitably supported by a bracket 42c on the side of the projector opposite from the motor 30, as seen in the left-hand portion of FIG. 1. The pull of the solenoid, by means of a suitably connected push button, is resisted by a spring 42d around the armature; and the free end of the slide bar 42 is slidably disposed in a projector frame slot 15a as seen in FIG. 4. The normal position of the slide bar is defined when a lug 42e bent up from the slide bar meets the frame 15 of the projector as shown in FIG. 3. The slide bar is designed to receive a short stroke in the direction of the arrow at the left extreme of FIG. 6—by the operation of the solenoid—when a film advance is to be instituted. The slide bar has a notch 45 which moves into registration with the index disc 40 when the slide bar takes the stroke mentioned, releasing the index disc for a turn in the direction of the arcuate arrow in FIG. 6 from the unwinding energy of the spring 26.

As an index of the quarter-turn of the film advance, the disc 40 must be stopped at the end of such turn. For this purpose, a companion disc 47—called a stop disc—is journaled on the shaft 18 next to the index disc; and a collar 48 is also mounted freely on the shaft after the stop disc. FIGS. 6 to 8 show that the stop disc is extended at the periphery with a series of teeth, a, b, c and d spaced 90 degrees apart. The stop disc has an arcuate slot 49 centered on the axis of the shaft 18; and the index disc 40 has a side pin 50 projecting through the slot 49. The stop disc also has a stud 52 laterally of the slot 49; and the pin 50 and stud 52 are connected by a spring 54.

Before the slide bar 42 is retracted as stated above to institute the film advance, the parts of the escapement are positioned as in FIG. 6, the slide bar seating in the notch A of the index disc, and the tooth a of the stop disc being located below the slide bar. When the index disc turns in the direction of the arcuate arrow for a film advance, the side pin 50 will draw on the spring 54 and stud 52 to turn the stop disc with the index disc until tooth b of the stop disc meets the slide bar as seen in FIG. 7. However, the side pin 50 remained in the trailing end of the slot 49 during the joint travel of the discs because of the effort required to turn the freely-journaled stop disc. Therefore, it can be assumed that the index disc did not finish its quarter-turn at the time the stop disc tooth b met the slide bar. From the continued tension of the spring 26 the index disc will, however, advance the side pin through the clearance afforded by the slot 49 to finish the quarter-turn when the side pin meets the leading end of the slot, as seen in FIG. 8. It will now be apparent that the finishing travel of the index disc will be resisted by the stretching of the spring 54, causing the ending of the film advance to be damped or softened, and injurious impact of the sprocket teeth with the film avoided.

In anticipating the finishing action just described, it is important that the slide bar 42, slot 49 and side pin 50 be positioned at points locating the index disc notch B at the level of the slide bar in order that the latter may return when the solenoid is de-energized—by the force of the solenoid spring 42d—to its original position and again block the rotation of the index disc, as shown in FIG. 8. Now the notch 45 of the slide bar forms a clearance for the teeth of the stop disc, and the tension of damping spring 54 will draw on stop disc 47 and cause it to revolve until the trailing end of slot 49 contacts side pin 50, thereby locating tooth b where tooth a now occurs in FIG. 6. At this point the escapement may be considered as re-set and the film stationary until its next advance is desired.

It will now be evident that the invention first provides means to store power in the spring 26 with a view to keep it fully wound for maximum power and speed to advance the film; and the relaxation of the spring from the expenditure of power for each film advance will reduce the tension in the drive from the motor and automatically turn the same on to resume the winding of the spring. Further, the relaxation of the latter occurs during a film advance. Therefore, the resumption of the power replenishment or build-up occurs while the film is again at a standstill. Since the interval at such time is always greater, and often much greater than the moment of film advance, sufficient time can be allowed for reduction-geared motor drive to wind a spring with ample power to operate as stated. It follows, therefore, that a small motor—battery powered— could be employed for building up the necessary power and speed required for efficient film-advancing impulses. It is further significant that the apparatus is automatic both for building up and storing spring power at all times, and to reset the escapement after each film advance. Finally, the escapement is a simple and compact mechanism employing but one coil spring which receives little strain. The apparatus is therefore of a nature to be fabricated at small cost and serve efficiently over a long period of use.

I claim:

1. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a motor operating through a worm pinion and a gear to wind a spring, and the motor advancing with the pinion when the spring becomes wound and the gear presents strong resistance as a result, and switch means disconnecting the motor on its advance.

2. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, and an index disc carried by the latter and formed with a series of cavities in the region of its periphery, such cavities spaced to define film advances according to said distance, and said control being a member seating in one of said cavities and movable to clear it and release the disc for a turning movement from the unwinding force of the spring to advance the film as stated.

3. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, and an index disc carried by the latter and formed with a series of cavities in the region of its periphery, such cavities spaced to define film advances according to said distance, said control being a member seating in one of said cavities and movable to clear it and release the disc for a turning movement from the unwinding force of the spring and advance the film as stated, and said other means being an element driven by the index disc and stopped by said member at a point limiting the rotation of the index disc to said distance.

4. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, and an index disc carried by the latter and formed with a series of cavities in the region of its periphery, such cavities spaced to define film advances according to said distance, said control being a member seating in one of said cavities and movable to clear it and release the disc for a turning movement from the unwinding force of the spring and advance the film as stated, and said other means being a stop disc driven by the index disc and formed with teeth along its periphery spaced as the cavities in the index disc, said stop disc being stopped by said member at a point limiting the rotation of the index disc to said distance.

5. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, an index disc centered on the latter and formed with a series of cavities in the region of its periphery, the cavities spaced according to the advances of the film, said other means being a rotary disc driven by the index disc and formed with teeth along its periphery spaced as the cavities in the index disc, and said control being a slide bar seating in one of said cavities and presenting a notch as a clearance for a leading one of said teeth, the release of the unit involving the retraction of the slide bar to a position presenting the notch as a clearance for the index disc, and the slide bar as a stop for the succeeding one of said teeth.

6. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, an index disc centered on the latter and formed with a series of cavities in the region of its periphery, the cavities spaced according to the advances of the film, said other means being a rotary disc journaled on the shaft and driven by the index disc, such rotary disc formed with teeth along its periphery spaced as the cavities in the index disc, and said control being a slide bar seating in one of said cavities and presenting a notch as a clearance for a leading one of said teeth, the release of the unit involving the retraction of the slide bar to a position presenting the notch as a clearance for the index disc, and the slide bar as a stop for the succeeding one of said teeth.

7. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, an index disc centered on the latter and formed with a series of cavities in its periphery, the cavities spaced according to the advances of the film, and said other means being a stop disc journaled on the shaft in proximity to the index disc and formed with a series of peripheral teeth spaced as said cavities, a bar seating in one of said cavities and operable to depart therefrom and release said unit when the film is to be advanced whereby to present a clearance for the rotation of the index disc, a spring connection between the discs procuring their joint rotation on said release, the bar forming a stop for one of said teeth, and the spring damping the rotation of the index disc as each of said cavities reaches a point even with the bar.

8. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, an index disc centered on the latter and formed with a series of cavities in its periphery, the cavities spaced according to the advance of the film, and said other means being a stop disc journaled on the shaft in proximity to the index disc and formed with a series of peripheral teeth spaced as said cavities, a bar seating in one of said cavities and operable to depart therefrom and release said unit when the film is to be advanced whereby to present a clearance for the rotation of the index disc, a spring connection between the discs procuring their joint rotation on said release, the bar forming a stop for one of said teeth, and the spring damping the rotation of the index disc as each of said cavities reaches a point even with the bar, the latter being reversible to seat in the next cavity and fix said point.

9. An apparatus for periodically advancing a slide film in a projector the distance of one slide, comprising a unit adapted to build up a storage of power during the intervals between film advances and operable to advance the film, a control for checking the operation of the unit during said intervals and releasing the unit for operation when the film is to be advanced, and means limiting the advance to said distance, said unit being a spring wound by a motor-operated shaft, an index disc centered on the latter and formed with a series of cavities in its periphery, the cavities spaced according to the advances of the film, and said other means being a stop disc journaled on the shaft in proximity to the index disc, such stop disc having an arcuate slot and a series of peripheral teeth spaced as said cavities, a pin passing from the index disc into the slot, a bar seating on one of said cavities and operable to depart from the cavity and release said unit when the film is to be advanced and to present a clearance for the rotation of the index disc, and a spring connecting the pin with the stop disc, the index disc drawing the stop disc into rotation by means of the spring on the release of the unit during each film advance, the bar forming a stop for one of said teeth, and the spring damping the rotation of the index disc as each of said cavities reaches a point even with the bar as an end of the advance.

References Cited

UNITED STATES PATENTS

| | | | |
|---|---|---|---|
| 1,834,406 | 12/1931 | La Bar et al. | 185—40 |
| 2,346,070 | 4/1944 | Fuller | 226—121 X |
| 2,612,976 | 10/1952 | Harper et al. | 226—134 X |
| 3,145,892 | 8/1964 | Hermann | 226—156 X |

ALLEN N. KNOWLES, *Primary Examiner.*

M. HENSON WOOD, JR., *Examiner.*